United States Patent [19]

Kaneko et al.

[11] Patent Number: 5,445,862

[45] Date of Patent: Aug. 29, 1995

[54] POROUS FILM AND PROCESS FOR PRODUCTION THEREOF

[75] Inventors: Shingo Kaneko, Hofu; Yoshio Murakami; Yoshinari Yamashita, both of Tokuyama, all of Japan

[73] Assignee: Tokuyama Corporation, Yamaguchi, Japan

[21] Appl. No.: 361,556

[22] Filed: Dec. 22, 1994

[30] Foreign Application Priority Data

Dec. 24, 1993 [JP] Japan ................... 5-327017

[51] Int. Cl.$^6$ ............ B41M 3/12; D02J 1/06
[52] U.S. Cl. ................... 428/148; 264/235.8; 264/288.8; 264/290.2; 428/315.5; 428/315.7; 428/317.9; 428/143; 428/323; 521/92; 521/134; 521/139; 525/65; 525/98; 525/130
[58] Field of Search ............ 428/315.5, 315.7, 317.9, 428/143, 323; 521/134, 139, 92

[56] References Cited

U.S. PATENT DOCUMENTS 4,472,328 9/1984 Sugimoto et al. ............ 264/41
4,698,372 10/1987 Moss ................... 521/145

FOREIGN PATENT DOCUMENTS

| 5-18856 | 8/1985 | Japan . |
| 4-82010 | 7/1987 | Japan . |
| 63-295649 | 12/1988 | Japan . |
| 1-204936 | 8/1989 | Japan . |
| 5-50522 | 3/1993 | Japan . |

*Primary Examiner*—Morton Foelak
*Attorney, Agent, or Firm*—Wenderoth, Lind & Ponack

[57] ABSTRACT

According to the present specification there is disclosed a porous film having a number of throughholes extending from one side to the other side, obtained by molding into a sheet form a resin composition comprising an ethylene-α-olefin copolymer, a thermoplastic elastomer and an inorganic filler and then subjecting the sheet to stretching for orientation. Said porous film has excellent flexibility, stretchability and moisture permeability. These properties are made possible by using individual components in particular proportions, molding the resulting composition into a sheet form and then stretching the sheet to form fine throughholes therein so as to have a moisture permeability of 2,000 g/m$^2$.24 hr or more.

38 Claims, No Drawings

POROUS FILM AND PROCESS FOR PRODUCTION THEREOF

BACKGROUND OF THE INVENTION

1. Field of the Invention

The present invention relates to a porous film having excellent flexibility, moisture permeability and stretchability, as well as to a process for production thereof. More particularly, the present invention relates to a porous film which is made of a composition comprising a particular ethylene-α-olefin copolymer, a particular thermoplastic elastomer and an inorganic filler and which has excellent flexibility, moisture permeability and stretchability, as well as to a process for production thereof.

2. Description of the Prior Art

The applications of porous films include a back sheet of disposable diaper. The porous film used in such an application is required to have the following properties. Firstly, the porous film must have good moisture permeability in order to prevent damp when a disposable diaper using said film is worn. Secondly, the porous film is required to have good touch and be flexible so as not to prevent the movement of a person wearing the Paper diaper. Further, the porous film is required to have a small residual strain after elongation, i.e. good stretchability, because a porous film having a large residual strain does not regain its original size after elongation, gives no feeling of fitness, and slip down.

Various methods have been proposed in order to obtain a polyolefin porous film having flexibility. The methods are largely divided into two methods, i.e. a method A which comprises adding a rubber-like component and a waxy or liquid component to a polyolefin resin and a method B which comprises employing a low modulus of elasticity resin as the matrix resin.

Typical examples of the method A include the followings. U.S. Pat. No. 4,472,328 discloses a method for obtaining a moisture-permeable film having flexibility by orientation of a film or sheet made from a composition comprising a linear low-density polyethylene (LLDPE) resin, a filler and a waxy or liquid hydrocarbon polymer. This moisture-permeable film or sheet, however, has no flexibility and stretchability as intended by the present invention. Japanese Patent Application Kokai (Laid-Open) No. 295649/1988 discloses a method for obtaining a film of high strength and low unevenness of stretching by adding, to a linear low-density polyethylene, an olefin terpolymer such as ethylene-propylene-diene copolymer or the like. The film has flexibility and moisture permeability owing to the addition of an olefin terpolymer, but has no sufficient stretchability. Increase in the addition amount of the olefin terpolymer in order to obtain higher stretchability results in a film of low moisture permeability.

The method B includes the followings. U.S. Pat. No. 4,698,372 discloses the use, as the matrix polymer, of an orientatable thermoplastic polymer having a low modulus of elasticity and a hydrophobic surface. An ethylene/propylene/1,4-hexadiene terpolymer is shown as an example of the matrix polymer. The matrix polymer, however, has a low melting point as appreciated from the fact that stretching at normal temperature is conducted. The resulting film, therefore, has high thermal shrinkage and its moisture permeability changes with a small heat. Thus, the film has no practical applicability. Japanese Patent Publication No. 82010/1992 discloses the use of an ethylene-α-olefin copolymer having a density of 0.86–0.91 g/cm$^3$, a boiling n-hexane insoluble of 10% by weight or more and a DSC peak temperature of 100° C. or more. The gas-permeable film using such a resin having the above properties has flexibility presumably owing to the presence of low molecular components but has no stretchability. Japanese Patent Application Kokai (Laid-Open) No. 50522/1993 discloses the use of an ethylene-propylene-diene copolymer/an ethylene-vinyl acetate copolymer. The films shown in Examples have flexibility and stretchability but are not satisfactory in moisture permeability. Moreover, they tend to emit an odor or cause blocking. Japanese Patent Publication No. 18856/1993 proposes a porous sheet having flexibility and stretchability, obtained by adding an inorganic filler to a polyolefin elastomer or a resin composition between said polyolefin elastomer and a polyolefin and stretching the resulting composition. As the polyolefin elastomer, there is used a resin composition comprising, as the main component, a soft resin such as ethylene-propylene copolymer, ethylene-butene copolymer or the like. The porous sheet using such a soft resin as the matrix, however, has problems, for example, no sufficient stretchability. Japanese Patent Application Kokai (Laid-Open) No. 204936/1989 discloses a moisture-permeable film comprising a linear ultralow-density polyethylene having a density smaller than 0.910 g/cm$^3$, a butadiene rubber and a filler. This moisture-permeable film, however, has a yield point as mentioned in the Examples of the document. A moisture-permeable film having a yield point, when elongated by a tension larger than the yield point and then subjected to tension relaxation, does not return to the original state, that is, has a large residual strain after the elongation.

In view of the above problems of the prior art, the present invention has an object of producing a porous film having flexibility, excellent moisture permeability and good stretchability.

SUMMARY OF THE INVENTION

In view of the fact that a porous film having not only high moisture permeability but also excellent flexibility and stretchability is required, for example, as a gas-permeable leakage-free sheet (used as a back sheet of disposable diaper or a material for apparel, etc.) and that no porous film satisfying all of these properties exists yet, the present inventors made a study focussing particularly on the materials constituting such a porous film. As a result, the present inventors found out that the above-mentioned object can be achieved by using a composition comprising a particular ethylene-α-olefin copolymer, a particular thermoplastic elastomer and an inorganic filler. The finding has led to the completion of the present invention.

According to the present invention there is provided a porous film having a number of throughholes extending from one side to the other side, obtained by processing into a sheet form a resin composition comprising an ethylene-α-olefin copolymer, a thermoplastic elastomer and an inorganic filler and then subjecting the sheet to stretching for orientation, in which sheet:

(a) the ethylene-α-olefin copolymer has a density of 0.86–0.90 g/cm$^3$ and a molecular weight distribution represented by Mw/Mn, of 3 or less and melting point of 60°–100° C., and is contained in an amount of 65–90% by weight based on the total resin weight, (b) the thermoplastic elastomer is at least one elastomer selected from the group consisting of a styrene-based elastomer, a polyester elastomer and a polyurethane elastomer and is contained in an amount of 35–10% by weight based on the total resin weight, (c) the inorganic filler is contained in an amount of 50–300 parts by weight per 100 parts by weight of the total of the ethylene-α-olefin copolymer and the thermoplastic elastomer, and (d) the moisture permeability of the porous film is 2,000 g/m$^2$.24 hr or more.

The porous film according to the present invention has excellent flexibility, high stretchability and an excellent moisture permeability of 2,000 g/cm$^2$.24 hr or more. The porous film having such properties, when used, for example, as a back sheet of disposable diaper, provides a leakage-free film having excellent fitness to body and causing no damp. The porous film having such properties is also usable in wide applications such as sanitary products (e.g. sanitary napkin) and the like; apparel such as raincoat, glove, disposable jumper and the like; medical care products such as operating gown, sheet and the like; building materials; and wrapping materials.

DETAILED DESCRIPTION OF THE INVENTION

In the present invention, the ethylene-α-olefin copolymer has a density measured by ASTM D 1505, of 0.86–0.90 g/cm$^3$, a molecular weight distribution (Mw/Mn) represented by the ratio of weight-average molecular weight (Mw) and number-average molecular weight (Mn) measured by gel permeation chromatography (GPC), of 3 or less, and a melting point measured by a differential scanning calorimeter (DSC), of 60°–100° C. When the copolymer has a density smaller than 0.86 g/cm$^3$, the film produced therefrom is inferior in heat resistance and strength and is difficult to stretch. Meanwhile, when the copolymer has a density exceeding 0.90 g/cm$^3$, the film produced therefrom is insufficient in flexibility and stretchability even after addition Of the thermoplastic elastomer described later. When the copolymer has a molecular weight distribution (Mw/Mn) exceeding 3, the film produced therefrom, even when its density is in the above range, has no sufficient moisture permeability, shows stickiness owing to the presence of low-molecular components, and has inferior stretchability. When the copolymer has a melting point measured by DSC, of lower than 60° C., the film produced therefrom must be stretched substantially at or around normal temperature for formation of throughholes therein and shows a high heat shrink. When the copolymer has a melting point of higher than 100° C., the film produced therefrom has inferior flexibility.

In the present invention, in order to obtain a porous film of excellent flexibility and stretchability, the density of the ethylene-α-olefin copolymer is preferably 0.87–0.89 g/cm$^3$; the molecular weight distribution is preferably 1.5–3, more preferably 1.5–2.5; and the melting point is preferably 65°–90° C., more preferably 70°–85° C.

The melt flow index of the ethylene-α-olefin copolymer at 190° C. at a load of 2,160 g is preferably 0.5–20 g/10 min, more preferably 1–10 g/10 min in view of the tear strength and stretchability of the film obtained.

The α-olefin of the ethylene-α-olefin copolymer is preferably an α-olefin having 4–10 carbon atoms so that the copolymer has the above-mentioned density, molecular weight distribution and melting point. The α-olefin having 4–10 carbon atoms can be exemplified by butene-1 and methylpentene-1. The content of the α-olefin in the copolymer is preferably 2–40 mole %, more preferably 5–20 mole % so that the porous film of the present invention can have good flexibility and stretchability. Further, the crystallinity of the copolymer measured by X-ray diffraction is preferably 5–25% in order to favorably form throughholes in the present porous film.

In the present invention, it is necessary to add a particular thermoplastic elastomer to the ethylene-α-olefin copolymer in order to obtain a porous film of excellent stretchability. The thermoplastic elastomer used is selected from a styrene-based elastomer, a polyester elastomer and a polyurethane elastomer.

The styrene-based elastomer comprises, as the hard segment, a polystyrene block and, as the soft segment, a block of polybutadiene, polyisoprene, polyethylene-polybutene, polyethylene-polypropylene or the like. Specific examples of the styrene-based elastomer are a styrene-butadiene block copolymer, a styrene-isoprene block copolymer, a styrene-ethylene-butene block copolymer and a styrene-ethylene-propylene block copolymer.

Of the above copolymers, the styrene-ethylene-butene block copolymer and the styrene-ethylene-propylene block copolymer are obtained, respectively, by adding hydrogen to the unsaturated bonds derived from the butadiene unit or the isoprene unit in the styrene-butadiene block copolymer and the styrene-isoprene block copolymer. In the present invention, these hydrogen-added styrene-based elastomers can be used preferably in order to allow the resulting porous film to have improved properties in weatherability, heat resistance, etc. With respect to the degree of hydrogen addition, it is preferable that the amount of unsaturated bonds derived from the butadiene unit or the isoprene unit in copolymer is as small as possible, and it is generally preferable that at least 99% of the number of unsaturated bonds present in copolymer is hydrogen-added.

Further, the styrene-based elastomer preferably contains the soft segment in a larger amount because the resulting porous film has flexibility. Generally, it is preferable that the styrene content is in the range of 10–20% by weight.

Furthermore, the styrene-based elastomer preferably has good fluidity because good processability is obtained. For example, there is preferred a styrene-based elastomer having a melt flow index at 190° C. at a load of 2,160 g, of 0.1–20 g/10 min.

As the polyester elastomer, there can be cited block copolymers having, as the hard segment, a crystalline polyester and, as the soft segment, a polyether or an aliphatic polyester. These block copolymers preferably contain the soft segment in a larger amount and have flexibility.

The polyurethane elastomer is a thermoplastic elastomer constituted by a soft segment consisting of a polyether or a polyester and a hard segment consisting of a glycol and a diisocyanate.

The inorganic filler has no particular restriction as long as it is a known inorganic filler generally used in resins or rubbers. There can preferably be used an inorganic filler having an average particle diameter of generally 0.1–50 μm, preferably 0.5–10 μm. Specific examples of the inorganic filler preferably usable in the present invention are metals such as Al, Si, Pb, Zn, Fe, Cu, Ni, Pd, Co, Mn, Cr, Mo, W, Ti, Zr and the like; metal oxides such as alumina, silica, antimony trioxide, zinc oxide, magnesium oxide, calcium oxide, iron oxide, copper oxide, silver oxide, titanium oxide and the like; metal hydroxides such as magnesium hydroxide, calcium hydroxide, aluminum hydroxide and the like; metal carbonates such as calcium carbonate, magnesium carbonate, barium carbonate, sodium carbonate and the like; metal sulfates such as sodium sulfate, calcium sulfate, barium sulfate, aluminum sulfate, iron sulfate and the like; metal carbides such as silicon carbide and the like; metal nitrides such as silicon nitride, boron nitride and the like; and metal sulfides such as zinc sulfide, mercury sulfide, copper sulfide, silver sulfide, iron sulfide, selenium sulfide and the like.

The proportions of the two components must be such that the ethylene-α-olefin copolymer is 65–90% by weight and the thermoplastic elastomer is 35–10% by weight. Preferably, the copolymer is 70–85% by weight and the elastomer is 30–15% by weight. In this case, the total of the copolymer and elastomer is 100% by weight. When the ethylene-α-olefin copolymer exceeds 90% by weight and the elastomer is less than 10% by weight, the flexibility and stretchability of the resulting mixture is about the same as those of the copolymer itself, and no mixing effect is obtained. Meanwhile, when the copolymer is less than 65% by weight and the elastomer exceeds 35% by weight, the stretching of the resulting mixture is difficult, causing rupture during the stretching and making large the dimensional shrink after the stretching.

The proportion of the inorganic filler must be 50–300 parts by weight per 100 parts by weight of the total of the ethylene-α-olefin copolymer and the thermoplastic elastomer in order to obtain a porous film which has very high flexibility, very high stretchability, high moisture permeability and excellent tear strength. The proportion is preferably 80–250 parts by weight. When the proportion is less than 50 parts by weight, the number of throughholes of the resulting film is small even when a large stretch ratio is employed, and no moisture-permeable film can be obtained. When the proportion exceeds 300 parts by weight, melt kneading is difficult, stretching becomes impossible, and no intended porous film is obtained.

In addition to the inorganic filler, there can be added, as necessary, other additives such as pigment, stabilizer, surfactant, plasticizer and the like in small amounts.

The porous film of the present invention has orientation as a result of stretching. Owing to the stretching, there occurs peeling at the interfaces between the resin (the copolymer and the elastomer) and the inorganic filler, whereby a large number of holes are formed. The orientation may be in a uniaxial direction or in a biaxial direction. The degree of the orientation is dependent upon the degree of the stretching (i.e. stretch ratio) described later. The preferable stretch ratio is generally 1.1- to 3.0-fold in the uniaxial stretching direction and, in the case of biaxial stretching, 1.1- to 3.0-fold in each of the longitudinal and transverse directions, because such a stretch ratio can allow the holes formed by the peeling of inorganic filler at said interfaces, to have an appropriate size and can provide a film having sufficient moisture permeability.

These holes extend from one side of the porous film of the present invention to the other side. Consequently, the porous film of the present invention has moisture permeability. The moisture permeability must be 2,000 g/m².24 hr or more in order to achieve good moisture permeation. A film having a moisture permeability of less than 2,000 g/m².24 hr shows insufficient moisture permeation and, when used, for example, as a back sheet of disposable diaper, is unable to remove the moistness caused by sweat or urine. The moisture permeability of the present porous film is preferably 2,500–6,000 g/m².24 hr, more preferably 3,000–5,000 g/m².24 hr in order to exhibit sufficient moisture permeation.

As mentioned above, the present porous film has a number of throughholes formed by the interfacial peeling between the resin and the inorganic filler. Generally, the porosity of the film is preferably 5–40%, more preferably 10–30% in order for the film to exhibit sufficient moisture permeation.

The present porous film has good moisture permeability as mentioned above but allows for no water permeation. Therefore, when the present porous film is used as a back sheet of disposable diaper, the film causes no damp inside the diaper because of the moisture permeability and gives rise to no urine leakage because of the water resistance. The water resistance of the present porous film is generally at least 5,000 mmH$_2$O and may be at least 10,000 mmH$_2$O.

The porous film of the present invention has excellent flexibility. The flexibility can be expressed in terms of strength at 50% elongation. When a porous film has too large a strength at 50% elongation, the film shows a large resistance to elongate it and has insufficient flexibility. The present porous film has a strength at 50% elongation, of generally 100–500 g/25 mm, preferably 120–450 g/25 mm.

The present porous film has no yield point. Therefore, the present porous film is free from such a problem (possessed by a resin having a yield point) that when a resin is elongated at a tension larger than the yield point and then the tension is relaxed, the resin does not return to its original size, that is, has a large residual strain. The residual strain after 50% elongation, of the present porous film is generally 10% or less and may be 9.5% or less.

The present porous film has a large tear strength in spite of being porous and satisfies the following formula $$Tr \geq 15 + t$$

wherein Tr is a tear strength (g) of porous film and t is a thickness (μm) of porous film.

The preferable thickness of the present porous film is, when the film is used as a back sheet of diaper, generally 10–100 μm, preferably 20–50 μm in view of the flexibility and touch.

The porous film of the present invention may be produced by any process but can preferably be produced generally by the following process. It is a process which comprises molding into a sheet form a resin composition comprising:

65–90% by weight, based on the total resin weight, of an ethylene-α-olefin copolymer having a density of 0.86–0.90 g/cm³, a molecular weight distribution represented by Mw/Mn, of 3 or less and a melting point of 60°–100° C., 35–10% by weight, based on the total resin weight, of at least one thermoplastic elastomer selected from the group consisting of a styrene-based elastomer, a polyester elastomer and a polyurethane elastomer, and 50–300 parts by weight, per 100 parts by weight of the total of the ethylene-α-olefin copolymer and the thermoplastic elastomer, of an inorganic filler, and then stretching the resulting sheet at least uniaxially at a temperature not higher than the melting point of the copolymer.

In the present invention, the mixing of the resin (the copolymer and the elastomer) and the inorganic filler is conducted by an ordinary means. In general, mixing by blender is conducted, and then mixing by melt kneader (e.g. extruder or Banbury mixer) is conducted. Thereafter, pelletization is conducted as necessary, followed by processing into film.

The method of molding into film is not particularly restricted, but an inflation processing method or an extrusion processing method using a T-die is preferred generally. The stretching after processing is conducted generally by uniaxial stretching (roll stretching), or by successive biaxial stretching (uniaxial stretching and subsequent transverse stretching using a tenter stretcher, an air inflation stretcher, a mandrel stretcher or the like), or by simultaneous biaxial (longitudinal and transverse) orientation, whereby a porous film can be obtained. The use of biaxial orientation is preferred.

The temperature of the orientation is preferably not higher than the melting point of the ethylene-α-olefin copolymer, particularly preferably a temperature 10° C. lower than the melting point. The stretch ratio is preferably 1.1- to 3.0-fold uniaxially, preferably longitudinally and, in the case of biaxial orientation, 1.1- to 3.0-fold in each of the longitudinal and transverse directions, to obtain a film having a balance in strength and elongation as well as excellent moisture permeability. After the orientation, there may be conducted a heat treatment and a surface treatment (e.g. a corona treatment).

The present invention is hereinafter described with reference to Examples and Comparative Examples. These Examples and Comparative Examples are illustrative of the present invention and are not intended to limit the scope of the present invention.

In the Examples and Comparative Examples, measurements of properties were conducted by the following test methods.

(1) Porosity

Calculated from the following formula, using the density of film.

$$\text{Porosity (\%)} = [(P_o - P)/P_o] \times 100$$

wherein $P_o$ is a density (g/cm) before orientation and $P$ is a density (g/cm$^3$) after orientation.

(2) Strength at 50% elongation

Measured at a speed of 200 mm/min, using a tensile tester (Tenslion produced by Toyo Baldwin Co., Ltd.).

(3) Residual strain after 50% elongation

A test piece was elongated by 50% between the two mark points under the same test conditions as in the above (2) and kept in that state for 10 minutes. Then, the test piece was removed from the tester and, 10 minutes later, measured for the length between the two mark points after recovery.

(4) Moisture permeability

Measured at 40° C. at a relative humidity of 90% by JIS Z 0208.

(5) Tear strength

Measured by JIS L 1085 A-1.

(6) Water resistance

Measured by JIS L 1092 B.

(7) Melt flow rate

Measured by JIS K 6760.

(8) Molecular weight and molecular weight distribution

Calculated from the data of GPC. (SSC 7100 of Senshu Kagaku was used.)

(9) Melting point

Using a differential scanning calorimeter, a sample was heated to 170° C., was maintained at that temperature for 15 minutes, was cooled to 0° C. at a rate of 2.5° C./min, and was heated to 170° C. at a rate of 10° C./min. The peak position of the maximum peak which appeared during the above procedure, was recorded and used to calculate the melting point of the sample.

(10) Crystallinity

Measured by X-ray diffraction method.

The components used in Examples and Comparative Examples are shown in Table 1 and Table 2.

TABLE 1

| Symbol | Kind of ethylene-α-olefin copolymer | Density (g/cm$^3$) | MFI at 190° C. | Mw × 10$^4$ | Mw/Mn | Melting point (°C.) | α-olefin content (mole %) | Crystallinity (%) | Remarks |
|---|---|---|---|---|---|---|---|---|---|
| A-1 | Ethylene-butene-1 copolymer | 0.89 | 3.6 | 12.2 | 2.1 | 85 | 9 | 16 | Tafmer A4090 (trade name) produced by Mitsui Petrochemical Industries, Ltd. |
| A-2 | Ethylene-butene-1 copolymer | 0.88 | 3.6 | 11.6 | 2.0 | 70 | 11 | 10 | Tafmer A4085 (trade name) produced by Mitsui Petrochemical Industries, Ltd. |
| A-3 | Ethylene-butene-1 copolymer | 0.89 | 4.0 | 12.0 | 4.3 | 113 | — | 19 | Excellen UEL 430 (trade name) produced by Sumitomo Chemical Co., Ltd. |
| A-4 | Ethylene-propylene copolymer | 0.87 | 2.9 | 9.0 | 2.0 | No melting point was observed. | — | 5 or below | Tafmer P0280 (trade name) produced by Mitsui Petrochemical Industries, Ltd. | ing test methods.

TABLE 2

| Symbol | Kind of thermoplastic elastomer or inorganic filler | Properties | Remarks |
|---|---|---|---|
| B-1 | Styrene-ethylene-butene block copolymer | Styrene content = 20% by wt., density = 0.89 g/cm$^3$, hydrogenation degree = 100%, MFI = 2.2 g/10 min (190° C. × 2,160 g load) | Tuftec H 1052 (trade name) produced by Asahi Chemical Industries Co., Ltd. |
| B-2 | Styrene-ethylene-propylene | Styrene content = 13% by wt., density = 0.89 g/cm$^3$, | Septon 2043 (trade name) pro- |

TABLE 2-continued

| Symbol | Kind of thermoplastic elastomer or inorganic filler | Properties | Remarks |
|---|---|---|---|
| | block copolymer | hydrogenation degree = 100%, MFI = 1.0 g/min (190° C. × 2,160 g load) | duced by Kuraray Co., Ltd. |
| B-3 | Polyester elastomer | Polyetherester type, density = 1.12 g/cm$^3$ | Hytrel 3548W (trade name) produced by Du Pont-Toray Co., Ltd. |
| B-4 | Polyurethane elastomer | Polyether type, density = 1.11 g/cm$^3$ | Elastollan 1180A (trade name) produced by Takeda Chemical Industries, Ltd. |
| B-5 | Liquid polybutadine | Terminal-hydroxylated liquid polybutadiene | Nisso Polybutadiene GI 2000 (trade name) produced by Nippon Soda Co., Ltd. |
| C-1 | Calcium carbonate | Average particle size = 1.0 μm, treated with stearic acid | Whiton (trade name) produced by Shiraishi Calcium Co., Ltd. |
| C-2 | Barium sulfate | Average particle size = 1.0 μm | B-54 (trade name) produced by Sakai Kagaku Kogyo K.K. |
| C-3 | Silica | Average particle size = 1.2 μm | Crystalite VX-S (trade name) produced by Tatsumori Limited. |

Examples 1-6 and Comparative Examples 1-6

An ethylene-α-olefin copolymer (shown in Table 1), a thermoplastic elastomer (shown in Table 2) and an inorganic filler (shown in Table 2) were mixed in the composition shown in Table 3, using a super mixer. The resulting mixture was passed through a biaxial extruder to form pellets. The pellets were passed through an inflation extruder having a screw diameter of 50 mm and a die diameter of 150 mm, under the following extrusion conditions to prepare various unstretched films each having a thickness of 35 μm and a spread width of 450 mm.

Extrusion conditions

Cylinder temperature = 130° C. ($C_1$), 140° C. ($C_2$), 140° C. ($C_3$)
Adapter temperature = 145° C.
Die temperature = 150° C.
Screw rotation = 30 rpm
Take-off speed = 10 m/min When the cylinder of the inflation extruder was divided into three sections of roughly the same lengths, the section closest to the material inlet was referred to as $C_1$; the section closest to the die was referred to as $C_3$; the intermediate section between them was referred to as $C_2$.

Each film was uniaxially stretched 1.8-fold at 45° C. using a roll stretcher. The resulting uniaxially stretched film was biaxially stretched using a biaxial stretcher having the following structure. That is, the biaxial stretcher comprised a feed roll, a mandrel (suspended by the feed roll) into which a preheater section and a spreading and stretching section were integrated, an air ring for externally heating the mandrel, and a take-off roll for taking off a stretched film. By this biaxial stretcher, the uniaxially stretched film having a spread width of 400 mm was stretched 1.7-fold in the transverse direction at 50°-55° C., cooled, and wound up. Each of the wound-up films had a thickness of 25 μm a substantial stretch ratio of 1.6×1.3.

Thus-obtained porous films had the following properties. The films each containing a thermoplastic elastomer in a desired amount exhibited elongation at a small stress; had no yield point and had a small residual strain and showed stretchability; and had an excellent tear strength, a high moisture permeability and waterproofness. Meanwhile, the films containing no thermoplastic elastomer were inferior to the films of Examples in residual strain; and the film containing a large amount of thermoplastic elastomer caused rupture during the stretching. The films composed mainly of an ethylene-α-olefin copolymer of low density and wide molecular weight distribution and the film containing a liquid polybutadiene, each had a large strain and had a low moisture permeability. The film containing an amorphous ethylenepropylene copolymer of low density and narrow molecular weight distribution ruptured during the uniaxial stretching.

The results are shown in Table 3.

TABLE 3

| | Composition | | | Stretching conditions | |
|---|---|---|---|---|---|
| | Ethylene-α-olefin copolymer (wt. %) | Thermoplastic elastomer (wt. %) | Inorganic filler (parts by weight)* | Temperature (uniaxial/biaxial) (°C.) | Ratio (MD/TD) |
| Example 1 | A-1 85 | B-1 15 | C-1 120 | 45/55 | 1.6 × 1.3 |
| Example 2 | A-1 70 | B-1 30 | C-1 120 | 45/55 | 1.6 × 1.3 |
| Example 3 | A-2 70 | B-1 30 | C-1 120 | 40/50 | 1.6 × 1.3 |
| Example 4 | A-1 80 | B-2 20 | C-1 120 | 45/55 | 1.6 × 1.3 |
| Example 5 | A-1 80 | B-3 20 | C-1 120 | 45/55 | 1.6 × 1.3 |
| Example 6 | A-1 80 | B-4 20 | C-1 120 | 45/55 | 1.6 × 1.3 |
| Comparative example 1 | A-1 100 | — — | C-1 120 | 45/55 | 1.6 × 1.3 |
| Comparative example 2 | A-1 60 | B-1 40 | C-1 120 | 45/55 | — |
| Comparative example 3 | A-3 100 | — — | C-1 120 | 45/55 | 1.6 × 1.3 |
| Comparative example 4 | A-3 70 | B-1 30 | C-1 120 | 45/55 | 1.6 × 1.3 |
| Comparative example 5 | A-1 90 | B-5 10 | C-1 120 | 45/55 | 1.6 × 1.3 |
| Comparative example 6 | A-4 100 | — — | C-1 120 | 40/— | — |

| | Properties of porous film | | | | | |
|---|---|---|---|---|---|---|
| | Thickness (μm) | Porosity (%) | Strength at 50% elongation (MD/TD) (g/25 mm) | Strain after 50% elongation (MD/TD) (%) | Moisture permeability (g/m$^2$ · 24 hr) | Tear strength (MD) (g) | Water resistance (mmH$_2$O) |

TABLE 3-continued

| Example | | | | | | | |
|---|---|---|---|---|---|---|---|
| Example 1 | 25 | 19.5 | 340/160 | 8.8/9.5 | 4000 | 75 | 12000< |
| Example 2 | 25 | 18.3 | 290/130 | 7.5/7.1 | 3600 | 70 | 12000< |
| Example 3 | 25 | 18.4 | 260/130 | 6.9/6.6 | 3800 | 75 | 12000< |
| Example 4 | 25 | 18.2 | 350/160 | 7.3/7.0 | 3900 | 70 | 12000< |
| Example 5 | 25 | 17.2 | 380/180 | 9.2/9.5 | 3100 | 60 | 12000< |
| Example 6 | 25 | 18.8 | 420/200 | 8.0/9.3 | 3500 | 65 | 12000< |
| Comparative example 1 | 25 | 20.4 | 420/220 | 11.0/14.5 | 4200 | 70 | 12000< |
| Comparative example 2 | — | — | Ruptured during biaxial stretching | — | — | — | — |
| Comparative example 3 | 25 | 16.3 | 410/220 | 15.5/19.5 | 1600 | 80 | 12000< |
| Comparative example 4 | 25 | 15.7 | 360/170 | 12.0/14.0 | 1700 | 60 | 12000< |
| Comparative example 5 | 25 | 12.0 | 300/130 | 10.0/12.0 | 900 | 80 | 12000< |
| Comparative example 6 | — | — | Ruptured during uniaxial stretching | — | — | — | — |

| | Composition | | | Stretching conditions | |
|---|---|---|---|---|---|
| | Ethylene-α-olefin copolymer (wt. %) | Thermoplastic elastomer (wt. %) | Inorganic filler (parts by weight)* | Temperature (uniaxial/biaxial) (°C.) | Ratio (MD/TD) |
| Example 7 | A-1 80 | B-1 20 | C-1 60 | 40/55 | 2.8 × 1.3 |
| Example 8 | A-1 80 | B-1 20 | C-1 250 | 40/55 | 1.2 × 1.1 |
| Example 9 | A-2 80 | B-1 20 | C-1 120 | 40/50 | 1.6 × 1.3 |
| Example 10 | A-1 80 | B-1 20 | C-2 180 | 45/55 | 1.6 × 1.3 |
| Example 11 | A-1 80 | B-1 20 | C-3 100 | 45/55 | 1.6 × 1.3 |
| Comparative example 7 | A-1 80 | B-1 20 | C-1 350 | 45/— | — |
| Comparative example 8 | A-1 80 | B-1 20 | C-1 40 | 45/55 | 1.6 × 1.3 |

| | Properties of porous film | | | | | | |
|---|---|---|---|---|---|---|---|
| | Thickness (μm) | Porosity (%) | Strength at 50% elongation (MD/TD) (g/25 mm) | Strain after 50% elongation (MD/TD) (%) | Moisture permeability (g/m² · 24 hr) | Tear strength (MD) (g) | Water resistance (mmH₂O) |
| Example 7 | 23 | 15.8 | 430/160 | 7.0/9.5 | 3100 | 60 | 8000 |
| Example 8 | 30 | 16.9 | 290/170 | 9.0/9.5 | 3200 | 120 | 12000< |
| Example 9 | 45 | 18.5 | 450/230 | 7.2/7.5 | 3500 | 110 | 12000< |
| Example 10 | 25 | 19.6 | 320/140 | 8.2/9.0 | 3700 | 65 | 12000< |
| Example 11 | 30 | 17.5 | 310/170 | 7.8/9.2 | 3000 | 70 | 10000 |
| Comparative example 7 | — | — | Ruptured during uniaxial stretching | — | — | — | — |
| Comparative example 8 | 45 | 10.1 | 450/150 | 9.0/12.0 | 500 | 90 | 1200< |

*Parts by weight per 100 parts by weight of the total of resin composer.
Note: Porous films according to Examples 1 to 11 had no yield point.

Examples 7-11 and Comparative Examples 7-8

Pellets were formed in the composition shown in Table 3 in the same manner as in Example 1, and passed through an inflation extruder in the same manner as in Example 1 to prepare various unstretched films. Each of the unstretched films was passed through the same biaxial stretcher as used in Example 1, to prepare various films different in stretch ratio, amount and kind of inorganic filler, and film thickness. When the amount of filler added was less than 50 parts by weight, the resulting film had a low porosity and accordingly a low moisture permeability. Conversely, when the amount of filler added exceeded 300 parts by weight, the resulting film caused rupture during the stretching. The results are shown in Table 3.

We claim:

1. A porous film having a number of throughholes extending from one side to the other side, obtained by processing into a sheet form a resin composition comprising an ethylene-α-olefin copolymer, a thermoplastic elastomer and an inorganic filler and then subjecting the sheet to orientation, in which (a) the ethylene-α-olefin copolymer has a density of 0.86-0.90 g/cm$^3$ and a molecular weight distribution represented by Mw/Mn, of 3 or less and melting point of 60°-100° C., and is contained in an amount of 65-90% by weight based on the total resin weight, (b) the thermoplastic elastomer is at least one elastomer selected from the group consisting of a styrene-based elastomer, a polyester elastomer and a polyurethane elastomer and is contained in an amount of 35-10% by weight based on the total resin weight, (c) the inorganic filler is contained in an amount of 50-300 parts by weight per 100 parts by weight of the total of the ethylene-α-olefin copolymer and the thermoplastic elastomer, and the moisture permeability of the porous film is 2,000 g/m$^2$.24 hr or more.

2. A porous film of claim 1, wherein the ethylene-α-olefin copolymer has a density of 0.87-0.89 g/cm$^3$.

3. A porous film of claim 1, wherein the ethylene-α-olefin copolymer has a molecular weight distribution represented by Mw/Mn, of 1.5-3.

4. A porous film of claim 1, wherein the ethylene-α-olefin copolymer has a molecular weight distribution represented by Mw/Mn, of 1.5-2.5.

5. A porous film of claim 1, wherein the ethylene-α-olefin copolymer has a melting point of 65°-90° C.

6. A porous film of claim 1, wherein the ethylene-α-olefin copolymer has a melting point of 70°-85° C.

7. A porous film of claim 1, wherein the ethylene-α-olefin copolymer has a melt flow index of 0.5-20 g/10 min as measured at 190° C. at a load of 2,160 g.

8. A porous film of claim 1, wherein the ethylene-α-olefin copolymer has a melt flow index of 1.0-10 g/10 min as measured at 190° C. at a load of 2,160 g.

9. A porous film of claim 1, wherein the α-olefin of the ethylene-α-olefin copolymer is an α-olefin of 4-10 carbon atoms.

10. A porous film of claim 1, wherein the α-olefin of the ethylene-α-olefin copolymer is 1-butene.

11. A porous film of claim 1, wherein the α-olefin content in the ethylene-α-olefin copolymer is 2–40 mole %.

12. A porous film of claim 1, wherein the α-olefin content in the ethylene-α-olefin copolymer is 5–20 mole %.

13. A porous film of claim 1, wherein the ethylene-α-olefin copolymer has a crystallinity of 5–25% as measured by X-ray diffraction.

14. A porous film of claim 1, wherein the styrene-based elastomer is a styrene-butadiene block copolymer, a styrene-isoprene block copolymer, a styrene-ethylene-butene block copolymer or a styrene-ethylene-propylene block copolymer.

15. A porous film of claim 1, wherein the styrene-based elastomer has a hydrogenation degree of 99% or more.

16. A porous film of claim 1, wherein the styrene content in the styrene-based elastomer is 10–20% by weight.

17. A porous film of claim 1, wherein the styrene-based elastomer has a melt flow index of 0.1–20 g/10 min as measured at 190° C. at a load of 2,160 g.

18. A porous film of claim 1, wherein the inorganic filler has an average particle diameter of 0.1–50 μm.

19. A porous film of claim 1, wherein the inorganic filler has an average particle diameter of 0.5–10 μm.

20. A porous film of claim 1, wherein the inorganic filler is a metal, a metal oxide, a metal hydroxide, a metal carbonate, a metal sulfate, a metal carbide, a metal nitride or a metal sulfide.

21. A porous film of claim 20, wherein the metal hydroxide is magnesium hydroxide, calcium hydroxide or aluminum hydroxide.

22. A porous film of claim 20, wherein the metal carbonate is magnesium carbonate, calcium carbonate, barium carbonate or sodium carbonate.

23. A porous film of claim 20, wherein the metal sulfate is sodium sulfate, calcium sulfate, barium sulfate, aluminum sulfate or iron sulfate.

24. A porous film of claim 1, wherein the ethylene-α-olefin copolymer is contained in an amount of 70–85% by weight based on the total resin weight and the thermoplastic elastomer is contained in an amount of 30–15% by weight based on the total resin weight.

25. A porous film of claim 1, wherein the inorganic filler is contained in an amount of 80–250 parts by weight per 100 parts by weight of the total of the ethylene-α-olefin copolymer and the thermoplastic elastomer.

26. A porous film of claim 1, which has a moisture permeability of 2,500–6,000 g/m².24 hr.

27. A porous film of claim 1, which has a moisture permeability of 3,000–5,000 g/m².24 hr.

28. A porous film of claim 1, which has a strength at 50% elongation, of 100–500 g/25 mm.

29. A porous film of claim 1, which has a strength at 50% elongation, of 120–450 g/25 mm.

30. A porous film of claim 1, which has a residual strain after 50% elongation, of 10% or less.

31. A porous film of claim 1, which has a tear strength satisfying the following formula $$Tr \geq 15 + t$$

wherein Tr is a tear strength (g) of porous film and t is a thickness (μm) of porous film.

32. A porous film of claim 1, which has a porosity of 5–40%.

33. A porous film of claim 1, which has a porosity of 10–30%.

34. A porous film of claim 1, which has a thickness of 10–100 μm.

35. A porous film of claim 1, which has a thickness of 20–50 μm.

36. A porous film of claim 1, which has a water resistance of 5,000 mmH₂O or more.

37. A porous film of claim 1, which has a water resistance of 10,000 mmH₂O or more.

38. A porous film of claim 1, which has no yield point.

* * * * *